United States Patent
Dietz et al.

(10) Patent No.: US 6,754,676 B2
(45) Date of Patent: Jun. 22, 2004

(54) APPARATUS AND METHOD FOR PROVIDING SELECTIVE VIEWS OF ON-LINE SURVEYS

(75) Inventors: Timothy Alan Dietz, Austin, TX (US); Lane Thomas Holloway, Pflugerville, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 09/952,005

(22) Filed: Sep. 13, 2001

(65) Prior Publication Data

US 2003/0050939 A1 Mar. 13, 2003

(51) Int. Cl.[7] .......................... G06F 7/00; G06F 17/00; G06F 12/00; G06F 17/30

(52) U.S. Cl. ................................. 707/104.1; 707/203

(58) Field of Search ........................ 707/2, 104.1, 102, 707/10, 205, 203; 705/7, 10, 11, 14

(56) References Cited

U.S. PATENT DOCUMENTS

| | | | | |
|---|---|---|---|---|
| 5,893,098 A | * | 4/1999 | Peters et al. ................... | 707/10 |
| 6,098,071 A | * | 8/2000 | Aoyama et al. ............. | 707/102 |
| 6,189,029 B1 | * | 2/2001 | Fuerst ......................... | 709/217 |
| 6,236,975 B1 | * | 5/2001 | Boe et al. ..................... | 705/7 |
| 6,477,504 B1 | * | 11/2002 | Hamlin et al. ................ | 705/10 |
| 6,519,557 B1 | * | 2/2003 | Emens et al. .................. | 704/8 |
| 6,574,638 B1 | * | 6/2003 | Gustman et al. ......... | 707/104.1 |
| 6,581,071 B1 | * | 6/2003 | Gustman et al. ......... | 707/104.1 |
| 2002/0052774 A1 | * | 5/2002 | Parker et al. .................. | 705/10 |
| 2002/0055932 A1 | * | 5/2002 | Wheeler et al. ......... | 707/104.1 |
| 2002/0078134 A1 | * | 6/2002 | Stone et al. ................. | 709/202 |
| 2002/0184252 A1 | * | 12/2002 | Holtz et al. .................. | 707/205 |

OTHER PUBLICATIONS

Robert A. Dennis and Sanjiv s. Gambhir (2000), InternetQuestion and Answer (iQ&A): A Web–Based Survey Technology, pp. 116–125.*

Karen E. Pettigrew and Joan C. Durrance (2001), Public Use of Digital Community Information Systems: Findings from a Recent Study with Implications for System Design, pp. 24–28.*

(List continued on next page.)

*Primary Examiner*—Safet Metjahic
*Assistant Examiner*—Merilyn P Nguyen
(74) *Attorney, Agent, or Firm*—Duke W. Yee; Mark E. McBurney; Stephen J. Walder, Jr.

(57) ABSTRACT

An apparatus and method for providing selective views of on-line surveys are provided. With the apparatus and method, each survey has a survey data structure and a template data structure. In a preferred embodiment, the data structures represent tree structures having nodes, child nodes, links between nodes and child nodes, and the like, for the survey and the template. Changes to the survey are made in the template data structure. The survey data structure and the template data structure are compared to one another, and nodes are either added, subtracted, or modified based on the differences between the survey data structure and the template data structure. In this way, the survey data structure retains the information that is already in present in it, such as the questions and answers previously provided. Thereafter, when the survey is again presented to a user, the user's previous answers to questions still remaining in the survey are displayed but no answers are displayed for newly added questions. In addition, if the questions are modified, the modified questions are presented with no answers displayed until provided by the user. In this way, answer data for questions that were previously answered and are still remaining in the survey after modification are not lost. In addition, the survey data itself is not corrupted by the modification of the survey.

30 Claims, 12 Drawing Sheets

OTHER PUBLICATIONS

David Nelson, Bob Ellis, and Laurie Reinhart (2001), SIG-GRAPH Public Policy Committee Activity Detailed, pp. 136–143.*

J. Gates, G. Wacker, and R. Billinton (1995), Development of Customer Survey Instruments for Reliability Worth Evaluation In Electric Power Systems, pp. 12–17.*

U.S. patent application Ser. No. 09/836,886, Cousins, filed Apr. 17, 2001.*

U.S. patent application Ser. No. 09/737,948, Stone, filed Dec. 18, 2000.*

U.S. patent application Ser. No. 09/747,160, Parker, filed Dec. 22, 2000.*

U.S. patent application Ser. No. 10/021,943, Holtz, filed Dec. 12, 2001.*

U.S. patent application Ser. No. 09/739,051, Callender, filed Dec. 15, 2000.*

U.S. patent application Ser. No. 09/682,207, Wheeler, filed Aug. 6, 2001.*

* cited by examiner

SURVEY
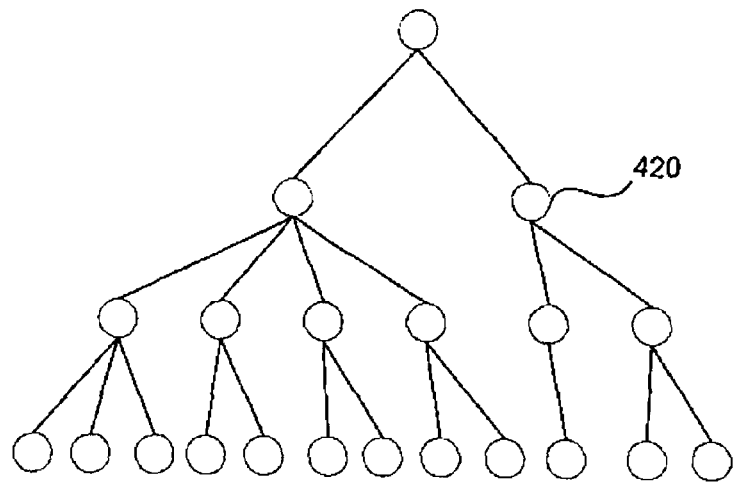
410
TEMPLATE
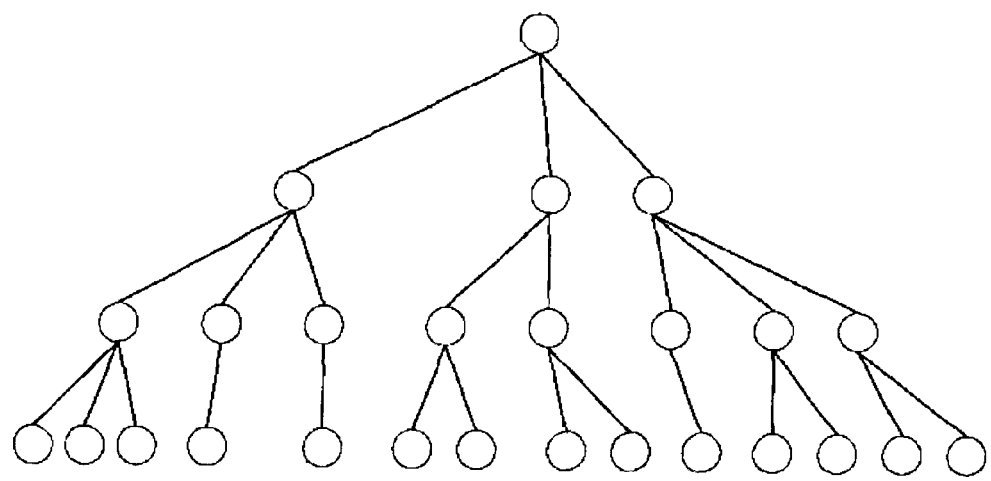
450
Figure 4A

```
<SURVEY>
  <GROUP name = "some text">
    <QUESTION>
      <TEXT>How are you doing?</TEXT>
      <TOOLTIP>Quite well, how about yourself?</TOOLTIP>
      <ANSWER>
          <CHECKBOX name="platform" value="good">Good</CHECKBOX>
          <TOOLTIP>If you feel good</TOOLTIP>
          <CHECKBOX name="platform" value="bad">Bad</CHECKBOX>
          <TOOLTIP>If you feel bad</TOOLTIP>
      </ANSWER>
    </QUESTION>
    <QUESTION>
      <TEXT>Something</TEXT>
      <TOOLTIP>Yes</TOOLTIP>
      <ANSWER>
          <TEXTBOX name="something">N/A</TEXTBOX>
      </ANSWER>
    </QUESTION>
  </GROUP>
  <GROUP name ="somethingelse">
      .
      .
      .
  </GROUP>
</SURVEY>
```

Figure 5

APPARATUS AND METHOD FOR PROVIDING SELECTIVE VIEWS OF ON-LINE SURVEYS

BACKGROUND OF THE INVENTION

1. Technical Field

The present invention is directed to an improved computing device. More specifically, the present invention is directed to an apparatus and method for providing selective view of on-line surveys.

2. Description of Related Art

In web based environments where surveys are conducted at given intervals, the survey may change each time it is given. That is, questions may be added, removed or modified, possible answer selections to the questions may be added, removed, or modified, and the like.

In such surveys, when the survey is updated, the answers to the old questions may be lost. This is because the answers to the questions are typically stored in a separate database from the survey itself. If the survey is modified, the answers will no longer correlate one to one with the survey questions in the updated survey.

In addition, when new data is added to a survey, or data is deleted from the suvey, the old data remaining in the survey may become corrupted. That is the old data may be entirely or partially overwritten or removed by the addition or deletion of data in the survey.

Therefore, it would be beneficial to have an apparatus and method for providing selective views of on-line surveys so that answer data is not lost and survey data is not corrupted when the survey is updated.

SUMMARY OF THE INVENTION

The present invention provides an apparatus and method for providing selective views of on-line surveys. With the present invention, each survey has a survey data structure and a template data structure. In a preferred embodiment, the data structures represent tree structures having nodes, child nodes, links between nodes and child nodes, and the like, for the survey and the template.

Changes to the survey are made in the template data structure. The survey data structure and the template data structure are compared to one another, and nodes are either added, subtracted, or modified based on the differences between the survey data structure and the template data structure. In this way, the survey data structure retains the information that is already in present in it, such as the questions and answers previously provided.

Thereafter, when the survey is again presented to a user, the user's previous answers to questions still remaining in the survey are displayed but no answers are displayed for newly added questions. In addition, if the questions are modified, the modified questions are presented with no answers displayed until provided by the user. In this way, answer data for questions that were previously answered and are still remaining in the survey after modification are not lost. In addition, the survey data itself is not corrupted by the modification of the survey because old data and/or questions that remain in the survey are not overwritten or deleted. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A is an exemplary tree diagram illustrating a survey and a survey template according to the present invention;

FIG. 5 is an exemplary diagram of one embodiment of a survey according to the present invention;

DETAILED DESCRIPTION OF THE PREFERRED EMBODIMENT

As touched on above, the present invention is directed to on-line surveys and the presentation of on-line surveys to survey takers, hereafter refereed to as users. The present invention may be implemented in both stand-alone computing devices and distributed data processing systems. While the present invention may be implemented in a stand-alone computing device, the present invention is especially suited for distributed data processing systems. Therefore, the following is a brief explanation of a distributed data processing system environment in which the present invention may implemented.

Figure 1:
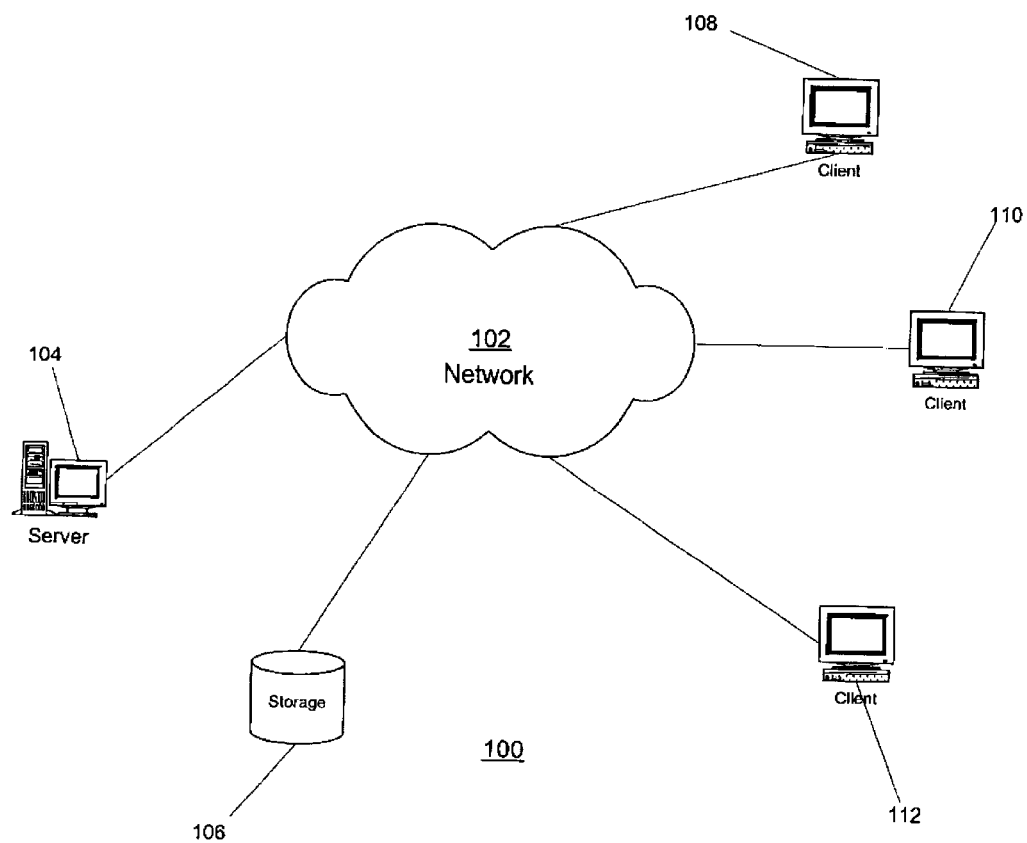
FIG. 1 is an exemplary diagram illustrating a distributed data processing system in accordance with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. The server 104 may be any type of server capable of providing content to a client device. In addition, clients 108, 110, and 112 are connected to network 102. These clients 108, 110, and 112 may be, for example, personal computers, personal digital assistants, (PDAs), cellular telephones, wireless two-way pagers, network computers, or any other computing device capable of communication via the network 102. In a preferred embodiment, these client devices 108, 110 and 112 are modified to include software instructions for implementing client side operations of the present invention, as described hereafter. However, the present invention is not limited to such an embodiment and all of the operations of the present invention may be implemented in server 104 without departing from the spirit and scope of the present invention.

In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
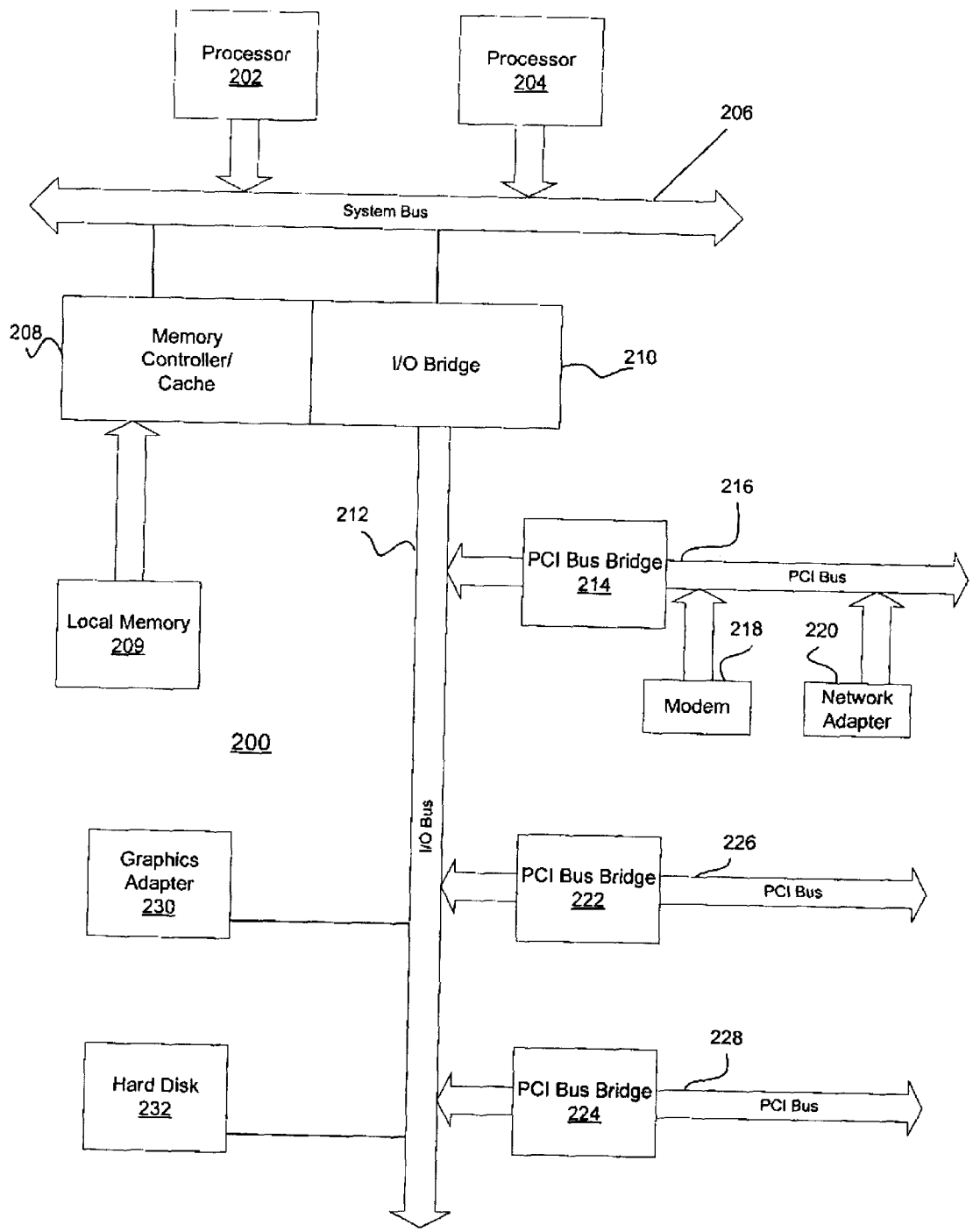
FIG. 2 is an exemplary diagram illustrating a server data processing device in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
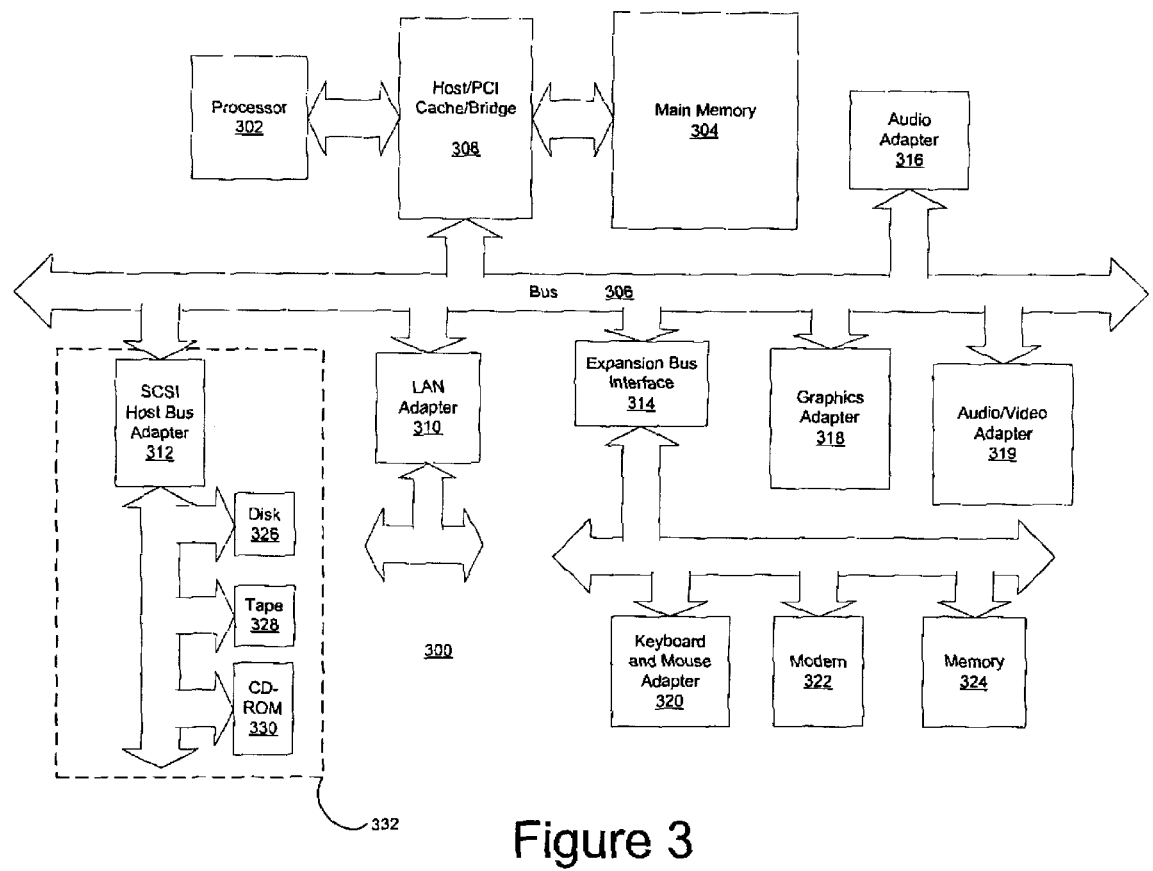
FIG. 3 is an exemplary diagram illustrating a client data processing device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations.

For example, data processing system 300 also may be a notebook computer or hand held computer in addition to taking the form of a PDA. Data processing system 300 also may be a kiosk or a Web appliance.

As mentioned above, the present invention provides a mechanism by which on-line surveys may be modified without losing previously provided answer data and without corrupting survey data. The present invention provides a survey data structure and a template data structure wherein modifications to the survey are performed on the template data structure. The modified template data structure and the survey data structure are then compared and changes are made to the survey data structure by adding, deleting, or modifying nodes in the survey data structure based on the differences between the survey data structure and the template data structure.

FIG. 4A shows exemplary diagrams of a survey data structure and a template data structure. The data structures shown in FIG. 4A are tree data structures as are typically used in extended markup language (XML). The present invention is not limited, however, to tree data structures of the use of XML. Rather, any data structure or programming language may be used without departing from the spirit and scope of the present invention. XML and tree data structures are used in the preferred embodiment simply because XML assures that the data is easily portable to many different platforms and also assures that the survey data structure is able to be parsed and entered into any database quickly.

As shown in FIG. 4A, the survey data structure 410 is comprised of a plurality of nodes 420 that represent elements of the survey. These elements may be, for example, groups, survey questions, attributes of the survey questions including the text, tooltips, answers, and the like. These nodes may further represent the actual answers chosen by a user.

The survey data structure 410 represents a version of the survey for a particular user. That is, when a user is presented with an on-line survey, the user's answers to questions in the survey are stored as nodes in the tree data structure and the entire tree data structure is stored in association with an identifier of the user. Thereafter, if changes are made to the survey, these changes need to be reflected in the survey data structure stored in association with the user identifier. The present invention provides a mechanism for doing so without losing the data stored in the survey data structure for the user.

Also shown in FIG. 4A is a template data structure 450 for the survey represented by the survey data structure 410. Without any modifications, the template data structure 450 resembles the survey data structure 410. However, from FIG. 4A it can be seen that the template data structure 450 has been modified from the survey data structure 410. That is, additional nodes are present in certain areas of the tree data structure and nodes have been removed from other areas of the tree data structure. The present invention allows changes to be made to the template data structure 450 and then have those changes reflected in an updated survey data structure 410 without losing data that is present in the original survey data structure.

Figure 4B:
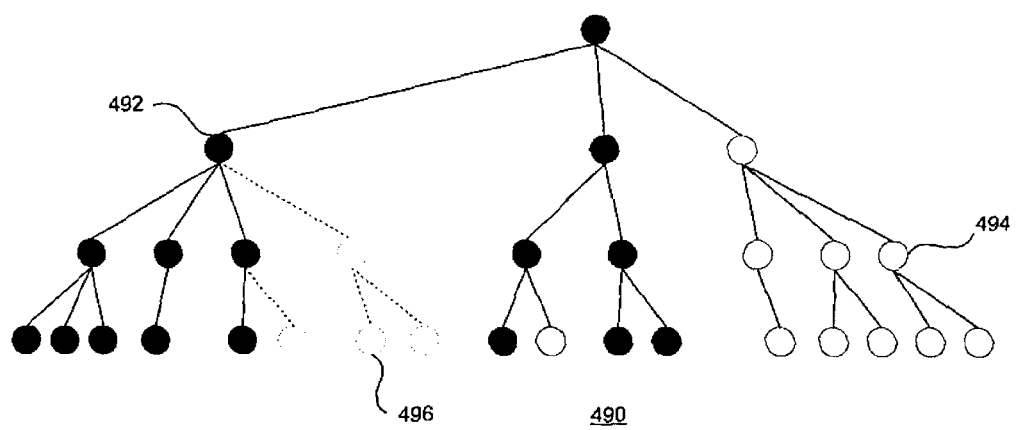
FIG. 4B is an exemplary tree diagram illustrating a combined survey and template according to the present invention.

FIG. 4B illustrates an updated survey data structure 490 that is the result of updating the original survey data structure 410 based on differences between it and the modified template data structure 450. As shown in FIG. 4B, darkened nodes 492 represent nodes that existed in the original survey data structure 410 and also the modified template data structure 450. Thus, the darkened nodes 492 represent nodes that are not changed. Non-darkened nodes 494 represent nodes that are added by the modifications to the template data structure 450. Nodes 496 that are in dashed lines represent nodes that are removed by the modifications to the template data structure 450.

The present invention generates the updated survey data structure 490 by comparing the original survey data structure 410 with the modified template data structure 450. The comparison generates differences between the original survey data structure 410 and the template data structure 450. These differences may include nodes that are added, nodes that are subtracted, or nodes that are modified.

Based on these differences, the original survey data structure 410 is updated to include these differences thereby generating the updated survey data structure 490. That is, nodes that are present in the template data structure 450 but not in the original survey data structure 410 are added to the original survey data structure. Similarly, nodes that are present in the original survey data structure 410 but not in the template data structure 450 are removed from the original survey data structure 410. In addition, nodes that are modified in the template data structure 450 from corresponding nodes in the original survey data structure 410 are modified in the original survey data structure 410 to resemble the modified nodes in the template data structure 450. The modified original survey data structure is then stored as an updated survey data structure 490. In this way, any nodes not altered by the above operation retain their original characteristics and values. Thus, data present in the original survey data structure, that is not modified by the updating of the survey data structure, is retained.

In a preferred embodiment of the present invention, the original survey data structure 410, template data structure 450, and updated survey data structure 490 are stored in an XML format. The XML format allows data to be stored in association with tags defined by the user. An example of an XML formatted survey data structure is shown in FIG. 5.

Figure 6:
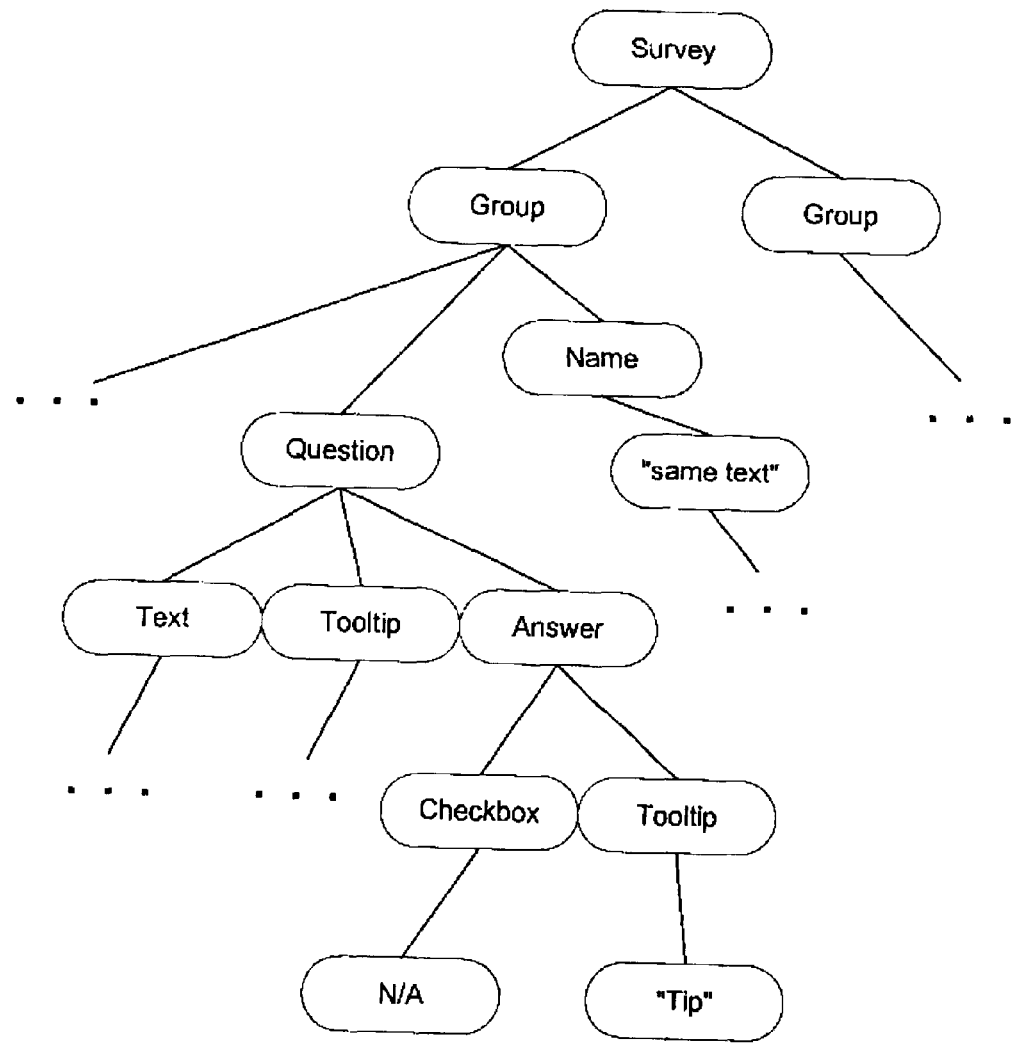
FIG. 6 is an exemplary tree diagram according to the example shown in FIG. 5.

When the XML formatted survey is parsed by the application operating on the survey data structure, the survey data structure is turned into a Document Object Model (DOM) which is stored in a tree structure, with SURVEY being the root node. FIG. 6 illustrates an example of the DOM tree structure corresponding to the XML formatted survey data structure in FIG. 5. Attribute nodes are stored off of the node that the attribute pertains to, such as the node series GROUP-NAME-"some text" in FIG. 6. More information about Document Object Models may be found at http://www.w3c.org/DOM, which is hereby incorporated by reference.

The present invention operates on the DOM tree structure of a survey data structure and template data structure to update the survey data structure based on modifications made to the template data structure. In the present invention, a main recursive function is provided that takes the root node of the survey data structure and the root node of the template data structure. This main recursive function first goes to the bottom node of each path in the tree structures and works its way back up the tree structures checking each of the nodes to make sure they exist in the survey tree structure.

The updating of the survey tree structure is driven by the template tree structure. That is, the survey tree structure is modified to resemble the template tree structure since all modifications to the survey are performed in the template tree structure prior to the modifications being mapped into the survey tree structure.

For example, if a node exists in the template tree structure, but not in the survey tree structure, the node is added into the survey tree structure at the appropriate position. If there is a node in the survey tree structure that is not present in the template tree structure, then the node is removed from the survey tree structure.

Similarly, if a node has been modified in the template tree structure, from the corresponding node in the survey tree structure, the node is modified in the survey tree structure. In a simple case, a determination of whether a node has been modified involves checking to see if the same node exists in the template or survey tree structures. In the case of a modification, the node in the survey tree structure does not exist in the template tree structure, and the node in the template tree structure does not exist in the survey tree structure. Thus, as a result, the recursive function of the present invention will cause the node that is present in the survey tree structure to be deleted and the node that is present in the template tree structure to be added to the survey tree structure in the appropriate position. In this way, the node is modified to be the same as that shown in the template tree structure.

The actual adding and deleting of nodes may be done in any appropriate manner. In a preferred embodiment, the adding and deleting are done using an application program interface (API) that is compliant with W3C XML and DOM (Level 1 and 2) and SAX (version 2) standards. The code used for this API is a freeware package called Xerces which can be found at (http://xml.apache.org).

Using this API with the present invention, tags may be added and deleted from the DOM tree structure. In the event of a modification to a node, if the modification is simple, such as merely changing the text of the node to reflect the new state, then just the tag is changed. However, if more than the text needs to be changed, tags are deleted and added, accordingly, to the DOM using this API.

The following is exemplary pseudo code for implementing the main recursive function of the present invention. Of course, there may be many "helper" functions to aid in performing the functions of the main recursive function. In the pseudo code shown below, the node ans is the survey associated with the answer and temp is the template.

Function createSurvey(Node ans, Node temp)
If temp is null return
Get a list of the nodes on the same level.
If any node is the same then go down another level by calling createSurvey(ans->child, temp->child) when the children are defined to be the same.
If there is a node that isn't found that the template contains, then add it to the ans.
If the ans contains nodes that the template doesn't have then delete them.

Figure 7:
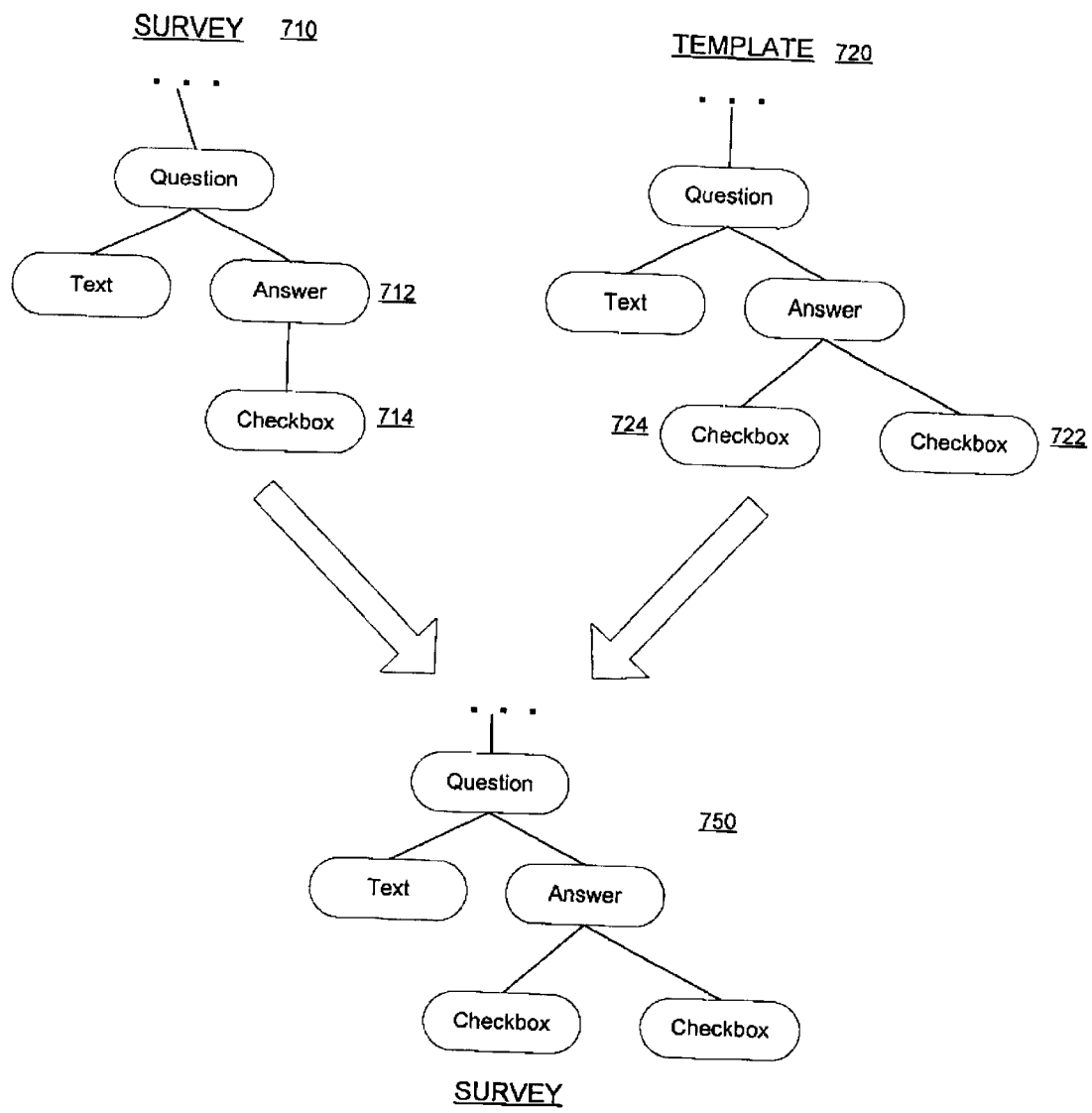
FIG. 7 is an exemplary diagram illustrating a mechanism for adding nodes to a survey according to the present invention.

FIG. 7 illustrates an operation of the present invention when adding nodes to a survey tree structure based on modifications to the template tree structure. As shown in FIG. 7, the survey tree structure 710 has an answer node 712 with only a single checkbox child node 714. The template tree structure 720 contains a modification to the survey that involves adding an additional checkbox child node 722 to the survey tree structure.

The present invention will parse the tree structures 710 and 720 starting with the bottom node of each path and check to make sure that the nodes in the tree structures 710 and 720 are present in the other one of the tree structures 710 and 720. Thus, in the example shown in FIG. 7, the present invention checks the node 724 to determine if this node is present in the survey tree structure 710. The check results in a determination that the node 724 corresponds to node 714 and therefore, no change is made to the node 714 in the survey tree structure. Next, the node 722 is checked against the survey tree structure 710. It is determined that there is no corresponding node in the survey tree structure 710 and therefore, the node 722 is added to the survey tree structure 710 in the updated survey tree structure 750. The position at which the node 722 is added in the survey tree structure 710 is determined based on its position in the template tree structure 720.

Figure 8:
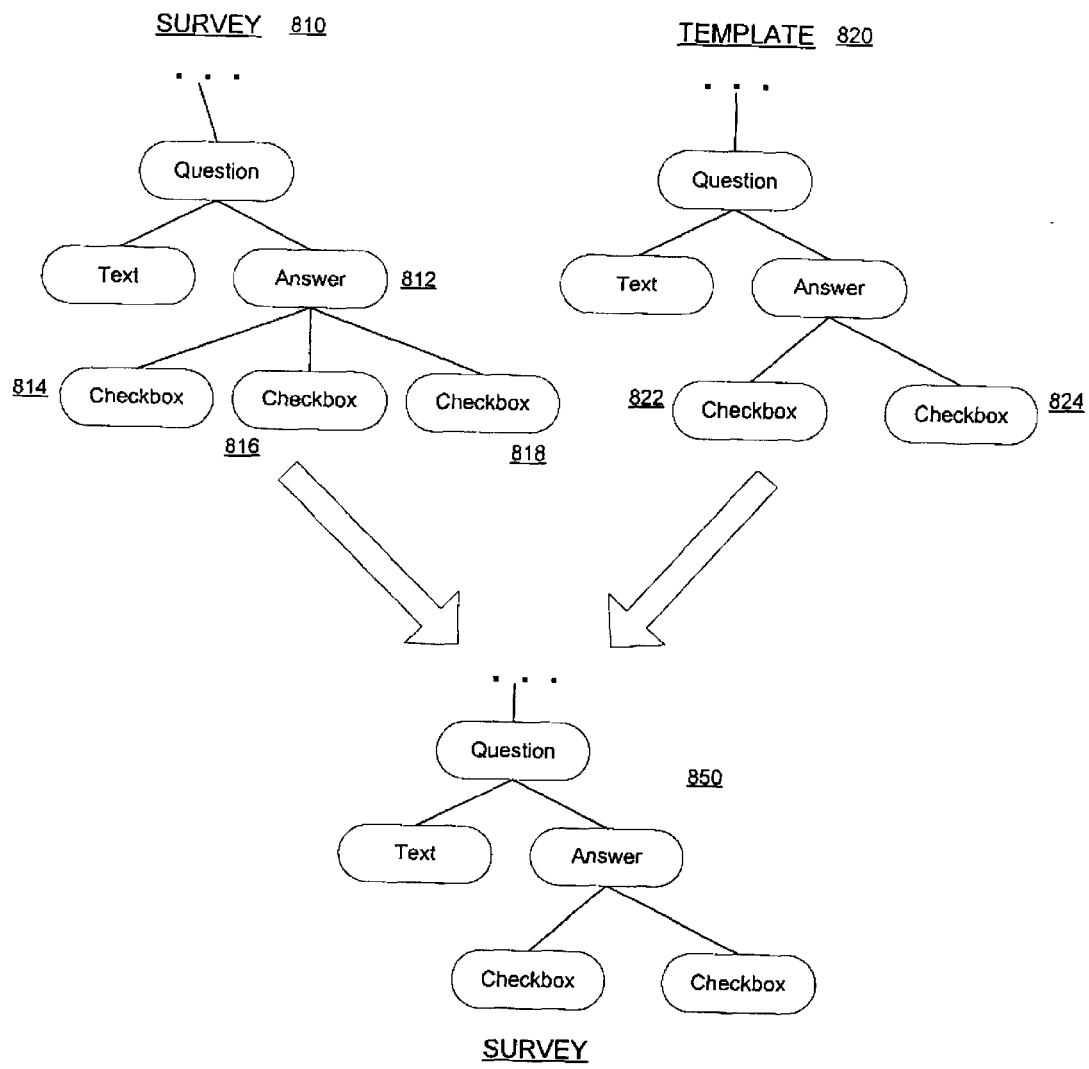
FIG. 8 is an exemplary diagram illustrating a mechanism for deleting nodes in a survey according to the present invention.

FIG. 8 illustrates an operation of the present invention to delete a node from a survey tree structure based on modifications made to a template tree structure. As shown in FIG. 8, the survey tree structure 810 has an answer node 812 with three checkbox child nodes 814, 816 and 818. The template tree structure 820 contains a modification to the survey that involves deleting a checkbox child node from the survey tree structure.

The present invention will parse the tree structures 810 and 820 starting with the bottom node of each path and check to make sure that the nodes in the tree structures 810 and 820 are present in the other one of the tree structures 810 and 820. Thus, in the example shown in FIG. 8, the present invention checks the node 822 to determine if this node is present in the survey tree structure 810. The check results in a determination that the node 822 corresponds to node 814 and therefore, no change is made to the node 814 in the survey tree structure.

Next, the node 824 is checked against the survey tree structure 810. It is determined that node 824 corresponds to node 816 in the survey tree structure 810. The comparison then checks the node 818 against the template tree structure 820. It is determined that there is no corresponding node in the template tree structure 820 and therefore, the node 818 is deleted from the survey tree structure 810 in the updated survey tree structure 850.

Figure 9:
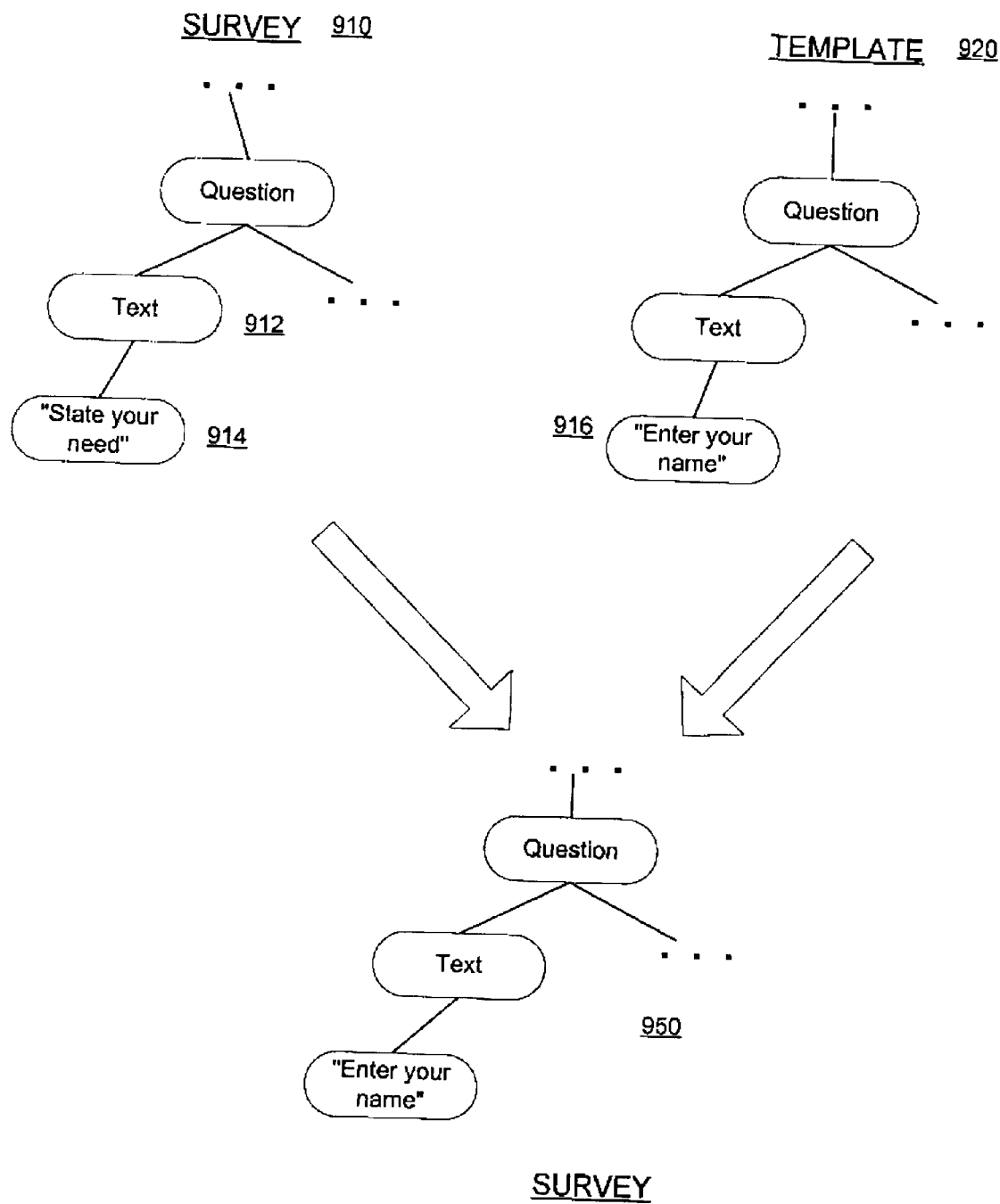
FIG. 9 is an exemplary diagram illustrating a mechanism for modifying nodes in a survey according to the present invention.

FIG. 9 illustrates a modification of a node in a survey based on modifications made to a template tree structure. As shown in FIG. 9, the survey tree structure 910 includes a text node 912 having an attribute node 914 with a value of "State your need." The template tree structure 920, however, has been modified so that the attribute node 916 has a value of "Enter your name."

The present invention parses the nodes from a bottom node of each path upwards. With the present invention, the node 916 is checked against the survey tree structure to determine if a corresponding node exists. Similarly, the node 914 is checked against the template tree structure 920 to determine if a corresponding node exits. Both checks result in a negative outcome. Therefore, the node 914 is deleted in the survey tree structure and the node 916 is added to the survey tree structure in a position identified by the template tree structure 920. As a result, in the updated survey tree structure 950, the node 914 in the original survey tree structure is modified to have the value "Enter your name."

Figure 10:
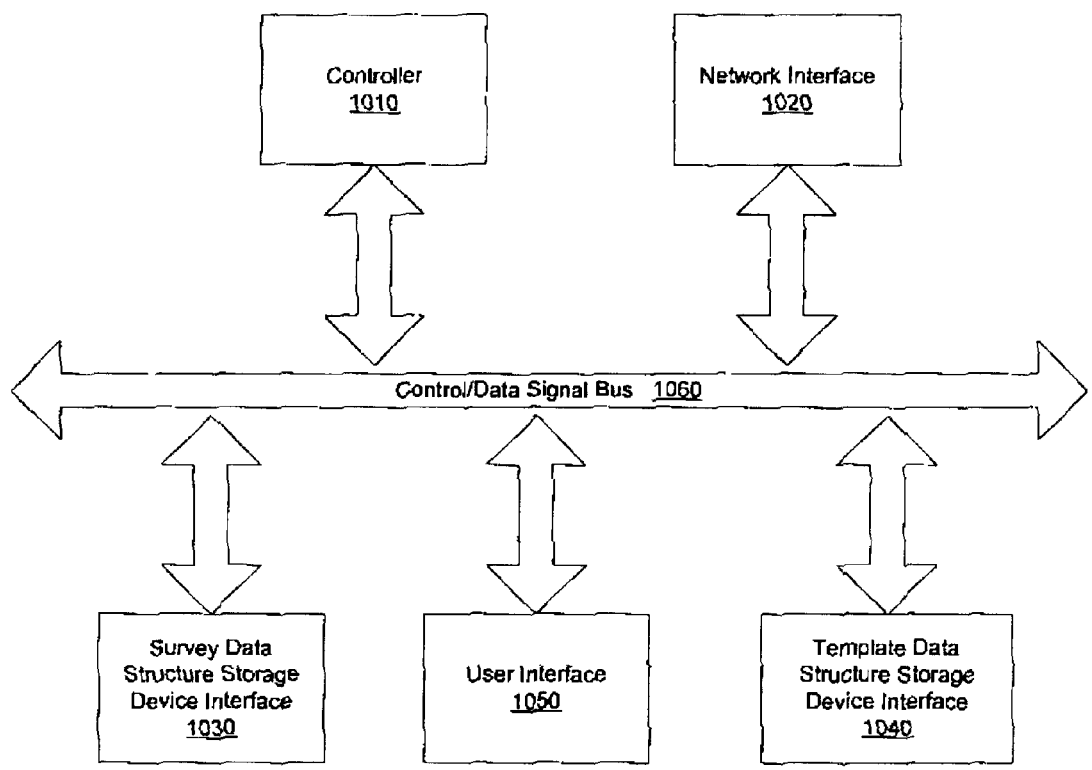
FIG. 10 is an exemplary block diagram of a survey management system according to the present invention.

FIG. 10 is an exemplary block diagram of a survey apparatus according to the present invention. The elements shown in FIG. 10 may be implemented in hardware, software, or a combination of hardware and software without departing from the spirit and scope of the present invention. For example, the present invention may be implemented as software instructions executed by a processor.

As shown in FIG. 10, the survey apparatus includes a controller 1010, a network interface 1020, a survey data structure storage device interface 1030, a template data structure storage device interface 1040, and a user interface 1050. The elements 1010–1050 are in communication with one another via the control/data signal bus 1060. Although a bus architecture is shown in FIG. 10, the present invention is not limited to such and any architecture that facilitates the communication of control/data signals between the elements 1010–1050 may be used without departing from the spirit and scope of the present invention.

The controller 1010 controls the overall operation of the survey apparatus and orchestrates the operation of the other elements 1020–1050. The controller 1010 provides surveys to client devices via the network interface 1020 and receives responses from the client devices via the network interface 1020. These responses are stored in a survey data structure, in association with an identifier of the client device and/or user of the client device, in a storage device via the survey data structure storage device interface 1030.

At some time, the controller 1010 may receive a request to update a survey by a survey administrator, or the like. This request may be received, for example, through the user interface 1050 or the network interface 1020. In response to the request to update a survey, the controller 1010 may provide the survey template, retrieved from a template data structure storage device via the template data structure storage device interface 1040, to the administrator. The administrator may then make modifications to the template and issue a command to the controller 1010 to update the survey data structure.

Upon receiving the command to update the survey data structure, the controller 1010 retrieves the corresponding survey data structure from the survey data structure storage device and performs the operations of the present invention as detailed previously. This may involve retrieving a plurality of survey data structures corresponding to a plurality of users or client devices that are stored in the survey data structure storage device.

The present invention compares the modified template to the survey data structure and adds, deletes, or modifies nodes in the survey data structure according to the modifications made to the template data structure. The modified survey data structure is then stored in the survey data structure storage device. The modified template data structure is also stored in the template data structure storage device.

Thereafter, if a user again is presented with the survey, the data submitted by the user for various nodes in the survey data structure that were not modified by the administrator, will be displayed to the user in association with the node. Nodes that were modified will not have the data previously submitted by the user displayed. Thus, for example, if the user had previously entered their age in association with a node representing a question whose text was "Enter your age," and this node was not modified in the template data structure, then the age previously input by the user will be displayed in association with the text "Enter your age." In this way, survey data previously obtained, will not be lost through modification of the survey. Only nodes in the survey where modifications were made will have their data lost.

Figure 11:
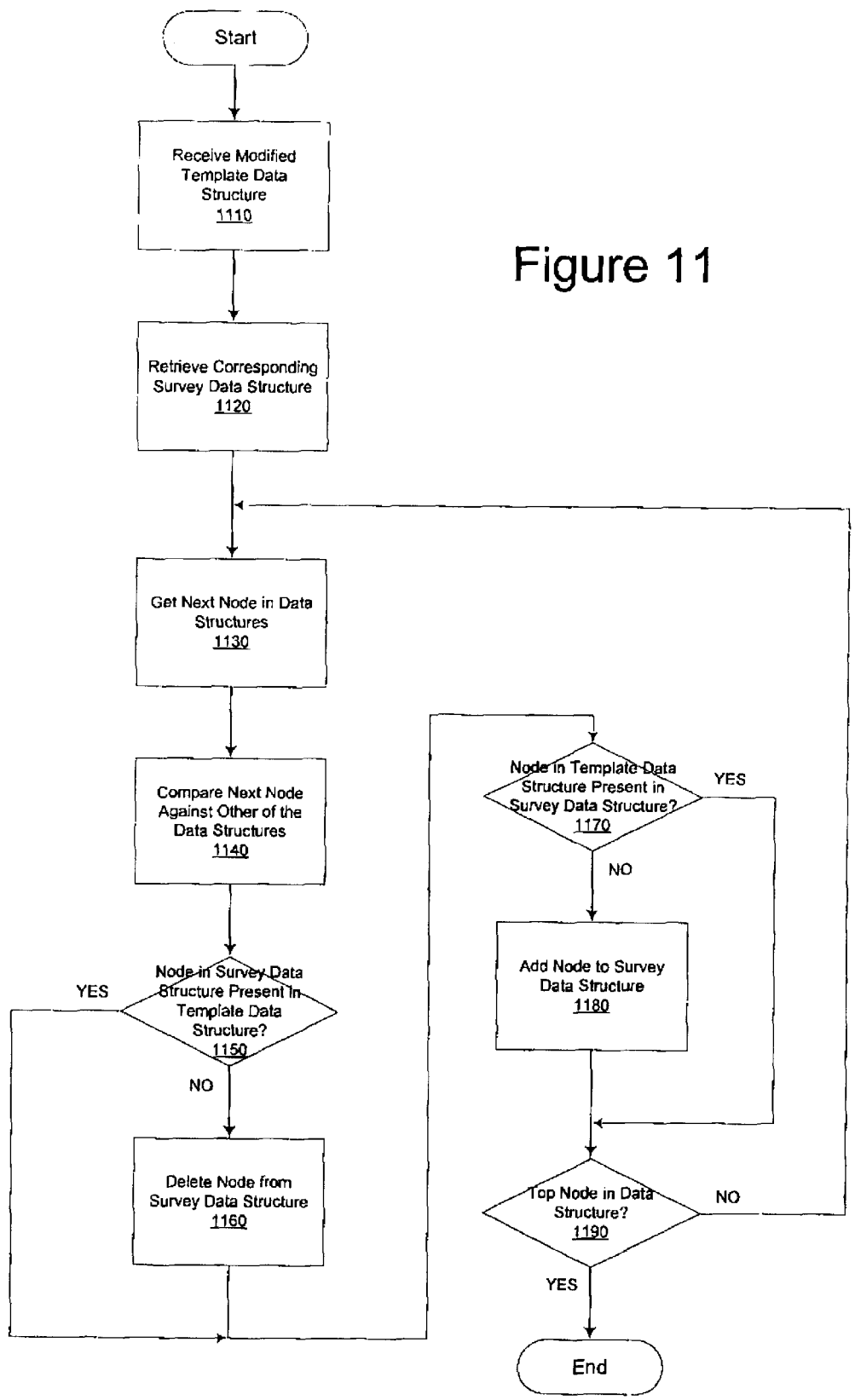
FIG. 11 is a flowchart outlining an exemplary operation of the present invention.

FIG. 11 is a flowchart outlining an exemplary operation of the present invention. The operation shown in FIG. 11 is performed for each path in the tree structures of the survey and template data structures. As shown in FIG. 11, the operation starts with receiving a modified template data structure (step 1110). The corresponding survey data structure is retrieved (step 1120). A next node in the data structures is identified (step 1130) and is compared against to other of the data structures (step 1140).

A determination is then made as to whether the next node in the survey data structure is present in the template data structure (step 1150). If so, the node is not modified, and operation continues to step 1170. If the node is not present in the template data structure, the node is deleted from the survey data structure (step 1160).

A determination is made as to whether the next node in the template data structure is present in the survey data structure (step 1170). If so, the node is not modified and the operation goes to step 1190. If the node is not present in the survey data structure, the node is added to the survey data structure (step 1180).

A determination is made as to whether this is the top node in the data structures (step 1190). If so, the operation ends. If not, the operation returns to step 1130 where the next node in the tree is identified.

Thus, the present invention provides an apparatus and method by which on-line surveys may be updated without losing data previously obtained via the survey. The present invention provides a template data structure through which modifications to the survey may be made and only the modifications mapped to the original survey data structure. In this way, the entire survey data structure is not replaced and previously obtained data for nodes that are not modified may be kept in the survey data structure.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of updating a survey, comprising:
updating a survey template data structure;
comparing the updated survey template data structure to a current survey data structure;
modifying the current survey data structure based on differences between the current survey data structure and the updated survey template data structure to thereby generate an updated current survey data structure; and
transmitting a presentation of the updated current survey data structure to a computing device for presentation to a user of the computing device, wherein the presentation of the updated current survey data structure includes an output of old questions in the updated current survey data structure associated with previously provided answers and an output of modified questions in the undated current survey data structure without associated previously provided answers.

2. The method of claim 1, wherein modifying the current survey data structure includes adding one or more nodes to a tree structure representation of the current survey data structure, the one or more nodes being present in the updated survey template data structure but not in the current survey data structure.

3. The method of claim 1, wherein modifying the current survey data structure includes deleting one or more nodes from a tree structure representation of the current survey data structure, the one or more nodes being present in the current survey data structure but not in the updated survey template data structure.

4. The method of claim 1, wherein modifying the current survey data structure includes changing one or more nodes in a tree structure representation of the current survey data structure, the one or more nodes being present in both the current survey data structure and the updated survey template data structure but having different values in the current survey data structure and the updated survey template data structure.

5. The method of claim 4, wherein changing one or more nodes includes modifying a text associated with a tag for the one or more nodes.

6. The method of claim 4, wherein changing one or more nodes includes deleting a node from the current survey data structure and adding a node from the updated survey template data structure to the current survey data structure in place of the deleted node.

7. The method of claim 1,
wherein the modified questions are new questions in the updated current survey data structure.

8. The method of claim 1,
wherein the output of the old questions and associated previously provided answers does not include questions deleted by updating the current survey data structure.

9. The method of claim 1,
wherein the modified questions are old questions in the updated current survey data structure that have had their values changed.

10. The method of claim 1, wherein modifying the current survey data structure based on differences between the current survey data structure and the updated survey template data structure is performed without losing previously provided answer data associated with questions in the current survey data structure that are not updated in the updated survey template data structure.

11. A computer program product in a computer readable medium for updating a survey, comprising:
first instructions for updating a survey template data structure;
second instructions for comparing the updated survey template data structure to a current survey data structure;
third instructions for modifying the current survey data structure based on differences between the current survey data structure and the updated survey template data structure to thereby generate an updated current survey data structure; and
fourth instructions for transmitting a presentation of the undated current survey data structure to a computing device for presentation to a user of the computing device, wherein the presentation of the undated current survey data structure includes an output of old questions in the updated current survey data structure associated with previously provided answers and an output of modified questions in the updated current survey data structure without associated previously provided answers.

12. The computer program product of claim 11, wherein the third instructions for modifying the current survey data structure include instructions for adding one or more nodes to a tree structure representation of the current survey data structure, the one or more nodes being present in the updated survey template data structure but not in the current survey data structure.

13. The computer program product of claim 11, wherein the third instructions for modifying the current survey data structure include instructions for deleting one or more nodes from a tree structure representation of the current survey data structure, the one or more nodes being present in the current survey data structure but not in the updated survey template data structure.

14. The computer program product of claim 11, wherein the third instructions for modifying the current survey data structure include instructions for changing one or more nodes in a tree structure representation of the current survey data structure, the one or more nodes being present in both the current survey data structure and the updated survey template data structure but having different values in the current survey data structure and the updated survey template data structure.

15. The computer program product of claim 14, wherein the instructions for changing one or more nodes include instructions for modifying a text associated with a tag for the one or more nodes.

16. The computer program product of claim 14, wherein the instructions for changing one or more nodes include instructions for deleting a node from the current survey data structure and instructions for adding a node from the updated survey template data structure to the current survey data structure in place of the deleted node.

17. The computer program product of claim 11,
wherein the modified questions are new questions in the updated current survey data structure.

18. The computer program product of claim 11,
wherein the output of the old questions and associated previously provided answers does not include questions deleted by updating the current survey data structure.

19. The computer program product of claim 11,
wherein the modified questions are old questions in the updated current survey data structure that have had their values changed.

20. The computer program product of claim 11, wherein the third instructions for modifying die current survey data structure based on differences between the current survey data structure and the updated survey template data structure are executed without losing previously provided answer data associated with questions in the current survey data structure that are not updated in the updated survey template data structure.

21. An apparatus for updating a survey, comprising:
means for updating a survey template data structure;
means for comparing the updated survey template data structure to a current survey data structure;
means for modifying the current survey data structure based on differences between the current survey data structure and the updated survey template data stricture to thereby generate an updated current survey data structure; and
means for transmitting a presentation of the undated current survey data structure to a computing device for presentation to a user of the computing device, wherein the presentation of the updated current survey data structure includes an output of old questions in the undated current survey data structure associated with previously provided answers and art output of modified questions in the updated current survey data structure without associated previously provided answers.

22. The apparatus of claim 21, wherein the means for modifying the current survey data structure includes means for adding one or more nodes to a tree structure representation of the current survey data structure, the one or more nodes being present in the updated survey template data structure but not in the current survey data structure.

23. The apparatus of claim 21, wherein the means for modifying the current survey data structure includes means for deleting one or more nodes from a tree structure representation of the current survey data structure, the one or more nodes being present in the current survey data structure but not in the updated survey template data structure.

24. The apparatus of claim 21, wherein the means for modifying the current survey data structure includes means for charging one or more nodes in a tree structure representation of the current survey data structure, the one or more nodes being present in both the current survey data structure and the updated survey template data structure but having different values in the current survey data structure and the updated survey template data structure.

25. The apparatus of claim 24, wherein the means for changing one or more nodes includes means for modifying a text associated with a tag for the one or more nodes.

26. The apparatus of claim 24, wherein the means for changing one or more nodes includes means for deleting a node from the current survey data structure and means for adding a node from the updated survey template data structure to the current survey data structure in place of the deleted node.

27. The apparatus of claim 21,
wherein the modified questions are new questions in the updated current survey data structure.

28. The apparatus of claim 21,
wherein the output of the old questions and associated previously provided answers does not include questions deleted by updating the current survey data structure.

29. The apparatus of claim 21,
wherein the modified questions are old questions in the updated current survey data structure that have had their values changed.

30. The apparatus of claim 21, wherein the moans for modifying the current survey data structure based on differences between the current survey data structure and the updated survey template data structure operates without losing previously provided answer data associated with questions in the current survey data structure that are not updated in the updated survey template data structure.

* * * * *